United States Patent
Tao et al.

(10) Patent No.: US 8,290,517 B2
(45) Date of Patent: Oct. 16, 2012

(54) PAGING MECHANISM IN A WIRELESS COMMUNICATION SYSTEM

(75) Inventors: Ming-Hung Tao, Tainan (TW); Ying-Chuan Hsiao, Jhubei (TW); Mamadou Kone, Jhudong Township (TW)

(73) Assignee: Industrial Technology Research Institute, Hsinchu (TW)

( * ) Notice: Subject to any disclaimer, the term of this patent is extended or adjusted under 35 U.S.C. 154(b) by 798 days.

(21) Appl. No.: 12/365,341

(22) Filed: Feb. 4, 2009

(65) Prior Publication Data

US 2010/0004001 A1    Jan. 7, 2010

Related U.S. Application Data

(60) Provisional application No. 61/078,540, filed on Jul. 7, 2008.

(51) Int. Cl.
*H04W 68/00*    (2009.01)

(52) U.S. Cl. ....................................................... 455/458

(58) Field of Classification Search .................. 455/458, 455/466, 450, 515–516, 418–420, 414.1, 455/435.1
See application file for complete search history.

(56) References Cited

U.S. PATENT DOCUMENTS

| | | | |
|---|---|---|---|
| 7,636,577 B2* | 12/2009 | Mohanty et al. | 455/458 |
| 7,853,274 B2* | 12/2010 | Qi et al. | 455/458 |
| 7,983,697 B2* | 7/2011 | Wu et al. | 455/458 |
| 2006/0194581 A1* | 8/2006 | Kang et al. | 455/436 |
| 2007/0254679 A1* | 11/2007 | Montojo et al. | 455/458 |
| 2008/0002741 A1* | 1/2008 | Maheshwari et al. | 370/473 |
| 2008/0311933 A1* | 12/2008 | Lim et al. | 455/458 |
| 2009/0129325 A1* | 5/2009 | Prakash et al. | 370/329 |

OTHER PUBLICATIONS

P802.16Rev2/D5, "Draft Standard for local and metropolitan area networks—Part 16: Air Interface for Broadband Wireless Access Systems", Jun. 2008.
IEEE 802.16m-08/003r3, "The Draft IEEE 802.16m System Description Document", Jun. 2008.
IEEE 802.16m-071002r4, "IEEE 802.16m System Requirements", Oct. 2007.

* cited by examiner

*Primary Examiner* — Brandon Miller
(74) *Attorney, Agent, or Firm* — Finnegan, Henderson, Farabow, Garrett & Dunner, LLP

(57) ABSTRACT

A communication system is disclosed which includes a communication network having a paging controller and a plurality of base stations to communicate with at least one mobile client device within the system. Also included in the communication system is a base station, between the plurality of base stations, receiving location updates from the at least one mobile client device; and a processor within the paging controller to accumulate the number of location updates relayed by the base station for each mobile client device, wherein the processor determines whether the accumulated number of location updates received exceeds a predetermined threshold number of location updates. The plurality of base stations each broadcast paging messages to the at least one mobile client device when the predetermined threshold number of location updates is not exceeded. The base station, among the plurality of base stations, solely broadcasts paging messages to the at least one mobile client device when the predetermined threshold number of location updates is exceeded.

12 Claims, 4 Drawing Sheets

PAGING MECHANISM IN A WIRELESS COMMUNICATION SYSTEM

PRIOR APPLICATION

This application claims the benefit of priority to U.S. Provisional Patent Application No. 61/078,540, filed Jul. 7, 2008, entitled "LOCATION-BASED PAGING MECHANISM IN A MOBILE COMMUNICATION SYSTEM," the entire contents of which are hereby incorporated by reference in its entirety.

BRIEF DESCRIPTION

1. Technical Field

A system and method disclosed herein generally relates to wireless networking and, more specifically, to a system and method that decreases paging overhead in wireless networks.

2. Description of the Related Art

Conventional wireless network environments connect mobile electronic devices to a service provider. Wireless network environments are often configured to create a mobile communication system that may provide wireless service to mobile client devices. Mobile communication systems often include at least one base station and at least one client device, which are typically each configured to transmit and receive information to and from each other creating a communication link. Conventionally, the number of base stations in a given geographic area depends on the service demand from the number of mobile client devices. A mobile client device will usually request service from the nearest or most capable base station. Typically, as a mobile client device changes its geographic location, it will establish a communication link with the nearest or most capable base station that may meet its service demand. The types of communication links established depend on whether the mobile client device is active or idle.

When the mobile client device is active, an active communication link is established and maintained between the mobile client device and the base station. When the mobile client device becomes idle, the active communication link between the mobile client device and the base station is deactivated. When the mobile client device is idle, an intermittent communication link is established between the paging controller through the base station to the mobile client device. This intermittent communication link usually results in communication exchanges such as a location update and a paging request.

A paging controller is used to communicate location updates and paging requests to mobile client devices in idle mode. The paging controller typically communicates with the mobile client devices through a base station. The base station is typically responsible for executing the paging requests, initiated by the paging controller, which cause the device to switch from its idle state to an active state when the paging controller wishes to "wake" the mobile client device from an idle state into an active state. The paging controller, through the base station, will also request an idle mobile client device perform a location update to determine whether or not the mobile client device is still within the service area of the paging group otherwise known as the "paging area." If it becomes necessary, the base station executes the paging request to locate a specific mobile client device in the wireless network. Paging requests, initiated by the paging controller, request that a mobile client device establish connection with the base station, perform a location update, or do nothing. A location update is either initiated by the mobile client device or is triggered by a paging request. The location update is used by the mobile client device to report its location to the paging controller.

The size of the paging area and the number of base stations within the paging area significantly contribute to a tradeoff in the computational efficiency of the location update and the paging request in the paging area. For example, if the communication system includes a large area with many base stations, the computational efficiency, or computational cost, of the location update is reduced because the mobile clients do not have to perform a location update in the same paging area. Conversely, however, the computational cost of transmitting the paging request is dramatically increased in this scenario. In such a scenario, the size of the paging message necessary to send a paging request to all of the mobile client devices in a paging area may be computationally unacceptable. As the number of mobile client devices requiring service in the wireless communication system increases, the computational cost of transmitting the paging message becomes a significant obstacle to providing service to each of the mobile client devices.

FIG. 1 shows a conventional wireless communication system. For purposes of explanation, a wireless communication system is controlled by controller 100, known as a paging controller, and includes three base stations 105, 110, and 115, belonging to the same paging group, though more or fewer base stations may be used. The communication system also has three mobile client devices 120, 125, and 130, though more or fewer mobile client devices may be used. Mobile client devices 120 and 130 typically remain within the boundaries of base stations 105 and 110 respectively. Mobile client device 125, however, moves among base stations 105, 110, and 115. As shown, each of base stations 105, 110, and 115 transmit the same paging message, from paging controller 100, regardless of which of mobile client devices 120, 125 and 130 are inside the boundary of the given base station. In this circumstance, paging message transmission costs are increased and degrade the efficiency of the system. A need therefore exists to decrease the computational transmission costs of a paging message in a wireless communication while not appreciably affecting the costs of a corresponding location update.

SUMMARY

Consistent with exemplary embodiments of the invention a communication system is disclosed. The communication system may include a communication network comprising a paging controller and a plurality of base stations to communicate with at least one mobile client device within the system. The communication system may further include a base station, between the plurality of base stations, receiving location updates from at least one mobile client device and relaying location updates to the paging controller; and a processor within the paging controller to accumulate the number of location updates relayed by the same base station for the at least one mobile client device, wherein the processor determines whether the accumulated number of location updates exceeds a predetermined threshold number of location updates. The plurality of base stations may each broadcast paging messages to the at least one mobile client device when the predetermined threshold number of location updates is not exceeded. The base station, among the plurality of base stations may solely broadcast paging messages to the at least one mobile client device when the predetermined threshold number of location updates is exceeded.

Consistent with yet other exemplary embodiments of the invention, a communication system having a communication network comprising a paging controller and a plurality of base stations is disclosed. The communication network may also comprise a mobile client device transmitting location updates to a base station, among the plurality of base stations; and a processor within the mobile client device to count each location update transmitted by the mobile client device to the base station wherein the processor determines whether a number of location updates transmitted to the base station exceeds a predetermined threshold number of location updates. The mobile client device receives paging messages from any of the plurality of base stations when the predetermined threshold number of location updates is not exceeded. The mobile client device receives paging messages from only the base station, among the plurality of base stations when the predetermined threshold number of location updates is exceeded.

Consistent with yet further exemplary embodiments of the invention, a computer-readable storage medium is disclosed. The computer readable storage medium may contain computer instructions which when performed by a processor cause the processor to perform a method of paging an idle mobile client device in a communication system. Steps of this method may include providing a plurality of base stations to provide service to at least one mobile client device; receiving a location update, in a base station between the plurality of base stations, from the idle mobile client device; accumulating the number of location updates relayed by the base station for the at least one mobile client device; determining whether the number of location updates exceeds a predetermined threshold number of location updates; transmitting a paging message from each of the base stations among the plurality of base stations to the mobile client device if the accumulated number of location updates does not exceed the predetermined threshold number of location updates; and transmitting a paging message solely from the base station receiving the location update from the mobile client device if the accumulated number of location updates does exceed the predetermined threshold number of location updates.

Also consistent with exemplary embodiments of the invention, a method of performing a paging update is disclosed. The steps of the method may include transmitting a paging message from each of a plurality of base stations to a mobile client device when a first base station from the plurality of base stations receives fewer than a predetermined threshold number of location updates; and transmitting a paging message solely from the first base station to a mobile client device when the first base station receives more than the predetermined threshold number of location updates from the mobile client device.

Consistent with embodiments of the invention, a method of uniquely identifying a mobile client device in a wireless communication network is disclosed. The steps of the method may include negotiating between a paging controller and at least one mobile client device to determine a current paging cycle configuration and a paging offset; providing a list of partial paging identification numbers based on the paging cycle configuration and the paging offset; assigning a partial paging identification number on the list to the at least one mobile client device; removing the assigned partial paging identification number from the list; combining the mobile client device paging cycle information with the partial paging identification number to create a unique final paging identification number; and assigning the unique final paging identification number to the mobile client device.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate various embodiments. In the drawings.

DESCRIPTION OF THE EMBODIMENTS

In the following description, for purposes of explanation and not limitation, specific techniques and embodiments are set forth, such as particular sequences of steps, interfaces and configurations, in order to provide a thorough understanding of the techniques presented herein. While the techniques and embodiments will primarily be described in context with the accompanying drawings, those skilled in the art will further appreciate that the techniques and embodiments may also be practiced in other network types.

Reference will now be made in detail to the exemplary embodiments of the invention, examples of which are illustrated in the accompanying drawings. Wherever possible, the same reference numbers are used throughout the drawings to refer to the same or like parts.

Figure 1:
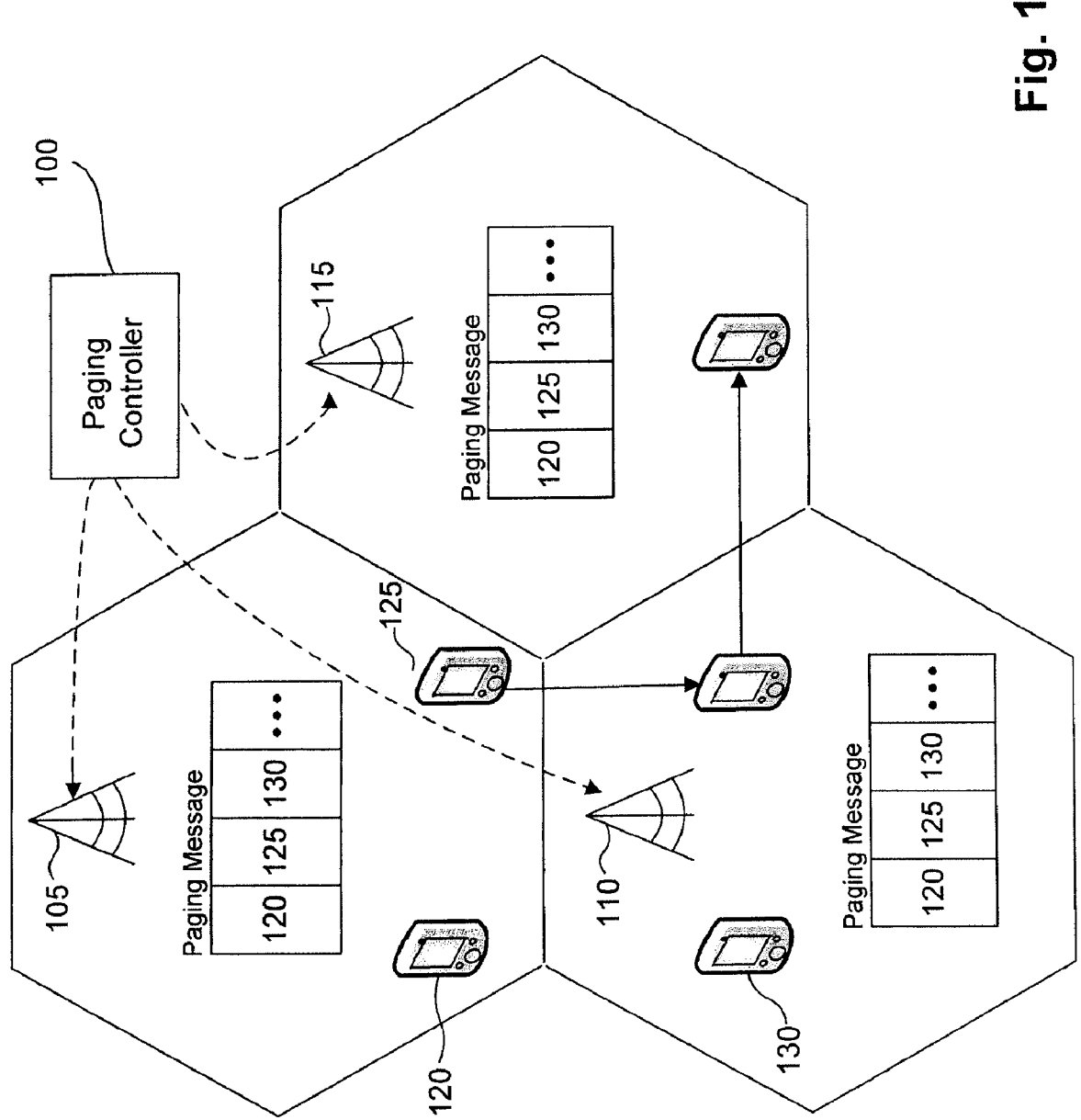
FIG. 1 is a block diagram illustrating a conventional paging update protocol.
Figure 2:
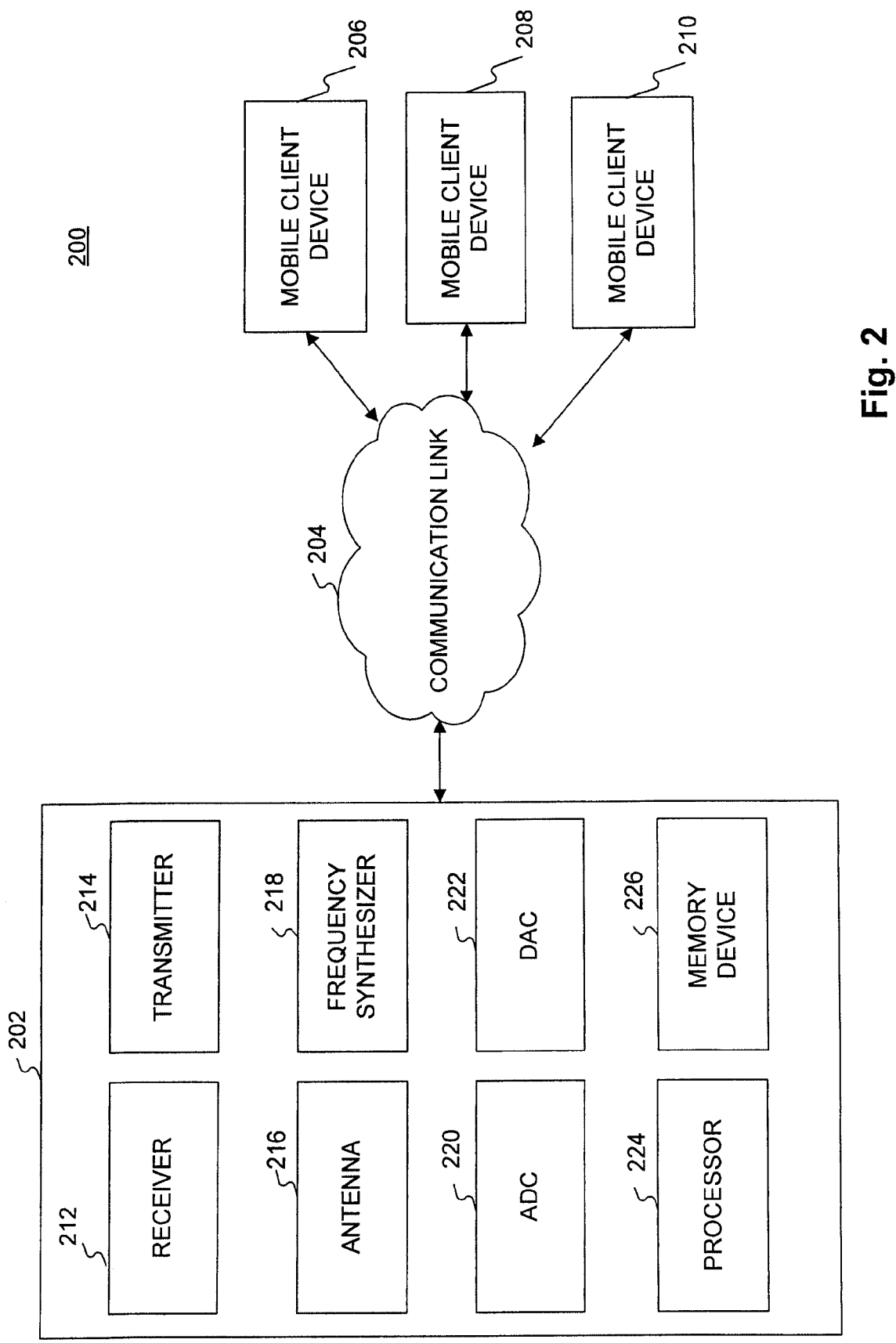
FIG. 2 is a block diagram illustrating a wireless communication system in accordance with another exemplary embodiment of the invention.

FIG. 2 is a block diagram illustrating a wireless communication system 200 in accordance with an exemplary embodiment of the invention. Communication system 200 facilitates communication between various electronic devices by way of processing, transmitting, and/or receiving data via base station 202. Specifically, system 200 may include a communication link 204 that facilitates communication between at least one mobile client device 206, 208, or 210, though more or fewer mobile client devices may be implemented in system 200. Communication link 204 may be established using one or more network types, such as a wide-area network (WAN), a local-area network (LAN), a 3G network, a Worldwide Interoperability for Microwave Access (WiMAX) network, a Long Term Evolution (LTE) network, Code-Division Multiple Access (CDMA) network, Wideband CDMA (WCDMA) network, any type of satellite or cellular network, or any other appropriate protocol to facilitate communication between base station 202 and at least one of mobile client devices 206, 208, and 210. Communication link 204 may be established by wire but is typically wireless and may, but need not, operate in accordance with protocols defined in IEEE (Institute of Electrical and Electronics Engineers) 802.11, 802.11a, 802.11b, 802.11e, 802.11g, 802.11h, 802.11i, 802.11n, 802.16, 802.16d, 802.16e, or 802.16m. Network connections between base station 202 and mobile client devices 206, 208, and 210 of communication system 200 may be established via satellite, Ethernet, telephone line, cellular channels, or other transmission media.

Each of base station 202 and mobile client devices 206, 208, and 210 of communication system 200 can include a combination of one or more application programs and one or more hardware components. For example, application programs may include software modules, sequences of instructions, routines, data structures, display interfaces, and other types of structures that execute operation of the present invention. Further, hardware components may include a combination of Central Processing Units (CPUs), buses, volatile and non-volatile memory devices, storage units, data processors, control devices, transmitters, receivers, antennas, transceivers, input devices, output devices, network interface devices, and other types of components that are apparent to those skilled in the art.

Consistent with an embodiment of the present invention, mobile client devices 206, 208, and 210 may send and/or receive data via communication link 204, and may perform various processing operations using the data. For example, data may be processed by base station 204 to acquire system configurations of a mobile client device, for example, mobile client device 206 or to broadcast information for downlink (DL) transmissions to mobile client devices.

As is illustrated in FIG. 2, base station 202 may include one or more of a receiver 212 for receiving data, a transmitter 214 for transmitting data, and an antenna 216 for directing transmission and reception of data. Base station 202 may also include a frequency synthesizer 218 for controlling the frequency of signals transmitted by transmitter 214, an analog-to-digital converter (ADC) 220 for down-converting signals, a digital-to-analog converter (DAC) 222 for up-converting signals, a processor 224, and a memory device 226. Memory device 226 may include any or all forms of non-volatile or volatile memory, including, by way of example, semiconductor memory devices, such as EPROM, RAM, ROM, DRAM, EEPROM, and flash memory devices; magnetic disks such as internal hard disks and removable disks; magneto-optical disks; CD-ROM disks; and other types of computer-readable storage media. Base station 202 may also include additional components. Mobile client devices 206, 208, and 210 may include components similar to the ones included in base station 202.

Although the exemplary embodiment of communication system 200 is described as having particular components arranged in a particular manner, one skilled in the art will appreciate that communication system 200 may include additional or fewer components that may be arranged differently. Communication system 200 may also be distributed among sub-systems operating in concert to implement the system. For example, communication system 200 may be implemented with a plurality of mainframe computers, base stations, subscriber stations, computing devices, access points, and/or mobile client electronic devices such as workstations, notebook computers, global positioning devices, cellular telephones, satellite telephones, and other handheld electronic devices.

Figure 3:
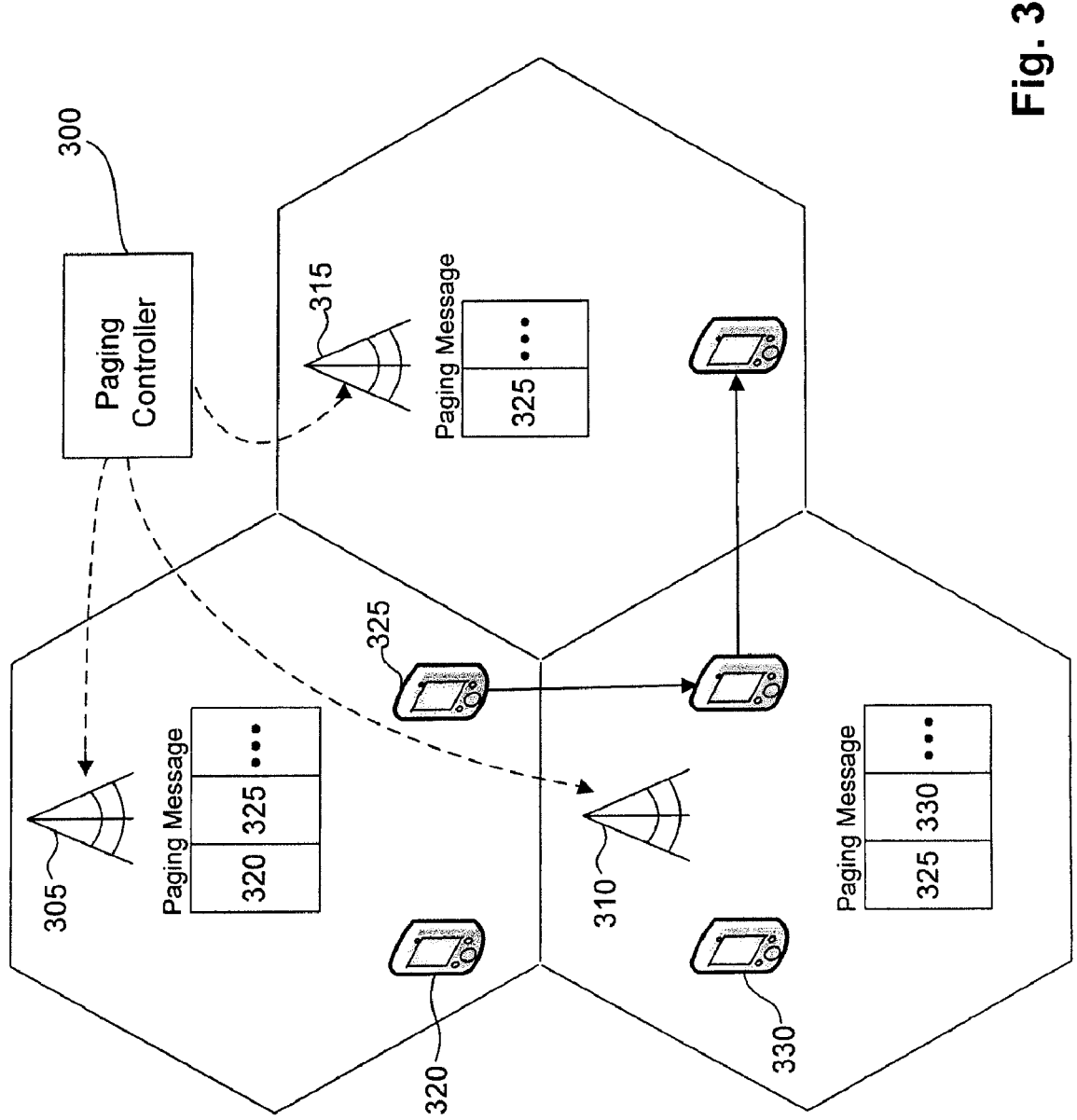
FIG. 3 is a block diagram of an exemplary paging update protocol, in accordance with another exemplary embodiment of the invention.

Referring now to FIG. 3, a communications system is provided. One exemplary embodiment of the communications system is a wireless communication system. For purposes of explanation, the wireless communication system comprises, a paging controller 300 and three base stations 305, 310, and 315, though more or fewer base stations may be used. Communication system 300 also has, for purposes of explanation, three mobile client devices 320, 325, and 330 though more or fewer mobile client devices may be present in implementation. Mobile client devices 320 and 330 typically remain within the service areas of base stations 305 and 310 respectively. Mobile client device 325, however, moves among service areas provided by base stations 305, 310, and 315. Service areas for base stations 305, 310, and 315 are shown as octagons surrounding each of these base stations though the actual shape of the service area will depend on various factors such as the transmitting power of the base station and the geographic terrain surrounding the base station. As shown, each of base stations 305, 310, and 315 transmits a different paging message depending on which of mobile client devices 320, 325 and 330 are or could be inside the service area of the given base station.

When operating in idle mode, a mobile client device may be allowed to periodically become available to downlink (DL) information broadcast by any of the base stations without actually acquiring service from the base station. Mobile client devices in idle mode are classified into different paging groups according to each device's mobility. Mobile client devices are classified as either global-wide mobile client devices or local-wide mobile client devices depending on the frequency with which the mobile client device travels between the service areas provided by different base stations. For example, a global-wide designation can be assigned to a mobile client device that travels into a new base station service area from another base station service area.

In this way, no communication from the idle mobile client device to a first base station is necessary unless the mobile client device needs to acquire service. A mobile client device acquiring service from a second base station is typically called a handover. In the configuration described, it is possible for a mobile client device in idle mode to enter a new service area without executing a handover. The mobile client device may remain disconnected from any base station until such time as the mobile client device wishes to become active or is determined to be missing. When the mobile client device becomes active, a network entry is performed to provide service to the mobile client device via the closest base station. By restricting idle mobile client devices, in this way, to periodic scans for downlink information and by avoiding execution of a handover until absolutely necessary, the mobile client device can save power. In addition to the power savings, the mobile client device may also increase computational efficiency of the base station by reducing the base station's paging costs as will be further described below. An idle mobile client device that moves very little may be classified into a local-wide paging group. An idle mobile client device that is very mobile may be classified into a global-wide paging group.

Base stations are typically configured to offer a region of contiguous service coverage to mobile client devices within the wireless communication system. It is advantageous, however, to configure each base station to provide service to mobile client devices in as large of a geographical area as practically possible. According to an embodiment of the present invention, it is advantageous to create a service area that is large enough that most mobile client devices will not usually travel outside the paging area. In such a configuration, a mobile client device needs neither a handover nor an uplink (UL) transmission connection to the base station but may still be paged if a downlink (DL) transmission is available for transmission to the mobile client device. In this way, conventional limitations on the size of each base station's geographic service area are overcome. Conventionally, a large paging area implies a large number of mobile client devices within that area which dramatically increases the computational cost for a base station to transmit a paging message. These costs are reduced by eliminating paging requests in areas where a mobile client device is not likely to be, effectively limiting superfluous and unnecessary paging as is further described below.

Paging information sent by the base station depends on which mobile client devices are designated as global-wide and which are designated local-wide. For example, paging information for a global-wide mobile client device is broadcast by each base station in FIG. 3. Paging information for a local-wide mobile client device is, however, only broadcast by the base station currently assigned to the mobile client device as shown in FIG. 3.

FIG. 3 shows that paging costs may be significantly reduced when base stations employ the above described paging control method by eliminating superfluous paging requests. In FIG. 3, mobile client devices 320 and 330 are determined to usually remain in service areas provided by base stations 305 and 310 respectively. Mobile client device 325 may frequently move among base stations 305, 310, and 315. As shown, the paging message for base station 305 includes each of the global-wide mobile client devices in the communication system, such as mobile client device 325, and each of the local-wide mobile client devices assigned to base station 305, for example, mobile client device 320. Base station 310 similarly broadcasts the paging message for each of the global-wide designated mobile client devices in the communications system which, in this case, is the paging message for mobile client device 325. Base station 310 also broadcasts the paging message for each of the mobile client devices designated as local-wide for base station 310 which, in this case, includes the paging message for mobile client device 330.

Base station 315 broadcasts only the paging message for mobile client devices designated as global-wide, which in this case is only mobile client device 325. Base station 315, in this embodiment, has no designated local-wide mobile client devices and therefore does not include a local-wide paging request in the paging message it broadcasts. Thus, in a paging group, each base station transmits a paging request for each mobile client device designated to the global-wide paging group in the system but only transmits a paging request for mobile client devices designated to the local-wide paging group assigned to that specific base station.

According to this embodiment, computational transmission costs for paging are decreased. In the above system, for example, base station 305 does not include a paging request for mobile client device 330 in the paging message, and base station 310 does not include a paging request for mobile client device 320, because these mobile client devices are only designated as local-wide devices. Designating mobile client device 320 and 330 prevents redundant paging messages since, for example, base station 305 does not send a paging request for mobile client device 330. Such a paging request, even if sent, would never be received by mobile client device 330 since mobile client device 330 is outside the service area provided by base station 305. Thus, redundant paging requests are eliminated from the paging message, which in turn reduces computational paging costs since base station resources are not expended to send the redundant paging messages.

According to another embodiment of the communication system, it is possible that a mobile client device that has been designated as either a global-wide or a local-wide mobile client device may change designations. For example, a global-wide mobile client device may remain in the service area provided by base station 315 for a length of time and may eventually be re-designated as a local-wide mobile client device. Similarly, mobile client device 320, for example, may begin traveling through service areas provided by base station 310 and 315 and may, for example, be re-designated as a global-wide mobile client device. In at least one embodiment, each mobile client device is designated as a global-wide device as a default as will be described below.

According to such an embodiment, location update records transmitted by the mobile client device to the base station are used to determine whether the mobile client device should be designated as a local-wide or a global-wide mobile client device. Using the location update records is a reliable, efficient, and easily implemented method to determine the most efficient paging group designation for a mobile client device. A processor in a paging controller first determines a threshold value designated $R_t$. This threshold value may be set to be any number of location records and may be modified, in advance or in real time, depending on the conditions in the communication system. For example, $R_t$ may be adjusted when the communication system is experiencing heavy or little network traffic. A mobile client device that remains in the service area of a single base station for the last $R_t$ location update records will be designated as a local-wide mobile client device.

Numerous wireless standards are promulgated by the IEEE to standardize wireless protocols. In one exemplary embodiment of the invention, communications system 300 may implement the IEEE 802.16e standard wireless protocols as discussed above. Under the 802.16e standard, there are four conditions that may cause a location update to be performed. These conditions are a paging change update, a timer update, a power down update, and a MAC hash skip threshold update. When at least one of these conditions is satisfied under the 802.16e standard, the location update can be performed.

The paging controller 300 or a base station, for example base station 305, 310, or 315, or a mobile client device, for example mobile client device 320, 325, or 330, or any combination thereof (including all of them), will keep a record of each location update resulting from any of the above conditions. When the number of location updates from the mobile client device indicates that, for the last $R_t$ location updates, the mobile client device has not traveled outside the service area provided by any of base stations 305, 310, or 315, the processor in the paging controller may designate the mobile client device as a local-wide device. If the location update shows that the mobile client device has traveled outside the service area of the base station, in the previous $R_t$ location updates, the mobile client device may maintain the default global-wide designation. A local-wide mobile client device is re-designated as a global-wide device after the first location update is sent from the mobile client device to a base station different from the base station that designated the mobile client device as a local-wide device.

Generally, paging request information for each mobile client device in the communication system is indexed by the MAC address, a number assigned to each mobile client device to uniquely identify the device. The MAC address of the device occupies a significant portion of the total number of bits transmitted as part of each paging message. Typically, it is necessary for a base station to transmit the MAC address as part of a paging message so that the correct mobile client device may recognize the paging request in the paging message. Broadcasting the entire MAC address as part of the paging message therefore adds significant paging costs to each paging message sent by paging controller 300 because the paging message requires more system resources as its size increases. Because the base station must maintain communication with a number of devices in a finite amount of time, and the message transmission speed is fixed by the size of the message to be sent, the number of idle mobile client devices that may be supported by a single base station is limited. The 802.16e standard attempts to limit the number of MAC address bits that must be transmitted by adopting the use of a MAC hash value. Using a MAC hash value in this way reduces the number of bits required to send a paging request index from 48 bits to 24 bits. Using the paging ID (PID) for each mobile client device instead of the MAC address further reduces the number of bits required to transmit a paging message from 48 bits to 8 bits. This greatly increases the efficiency of communication system 300, as will be discussed below, because the decreased size of a paging message allows a base station to transmit more information in a fixed amount of time.

Reducing the size of the paging message sent by paging controller 300 using the paging ID (PID) allows more mobile client devices to be supported by a single base station than by using the MAC address or the MAC hash address to uniquely identify each mobile client device. In the present scheme, a paging ID (PID) is constructed for each mobile client device using the mobile client device's partial paging ID (PID) and paging cycle information from paging controller 300 in the following manner.

When entering an idle state, a mobile client device, for example mobile client device 320, 325, or 330, will negotiate with paging controller 300 to determine its current paging cycle configuration and determine its paging offset. Paging controller 300 maintains partial paging IDs for each combined paging cycle and paging offset configuration and assigns the mobile client device a partial paging ID (PID) from a list of available partial paging IDs (PIDs). The assignment of the partial paging IDs (PIDs) from the list is based on the paging cycle and the paging offset information used by the mobile client device. Once assigned to the mobile client device, the paging ID (PID) is removed from the list so as to prevent repeated assignments of what are intended to be paging IDs (PIDs) that are unique to the paging cycle and paging offset configuration. Paging controller 300 then produces a final paging ID (PID) for the mobile client device by combining the mobile client device's assigned paging cycle information with the partial paging ID (PID). The final paging ID (PID) requires much less information than that required for a MAC hash address and a real MAC address because the final paging ID (PID) is 8 bits.

To receive the paging ID (PID), a base station will transmit the paging ID (PID) to the target mobile client device using a range-response message when the mobile client device becomes idle or moves to an area covered by a new paging group. Joining a new paging group could be the result of the mobile client device entering the service area of a new base station belonging to a different paging group. The idle mobile client device will monitor the paging ID (PID) in the paging messages sent by the base station providing its service to listen for its paging request until it joins a new paging group or is turned off.

Figure 4:
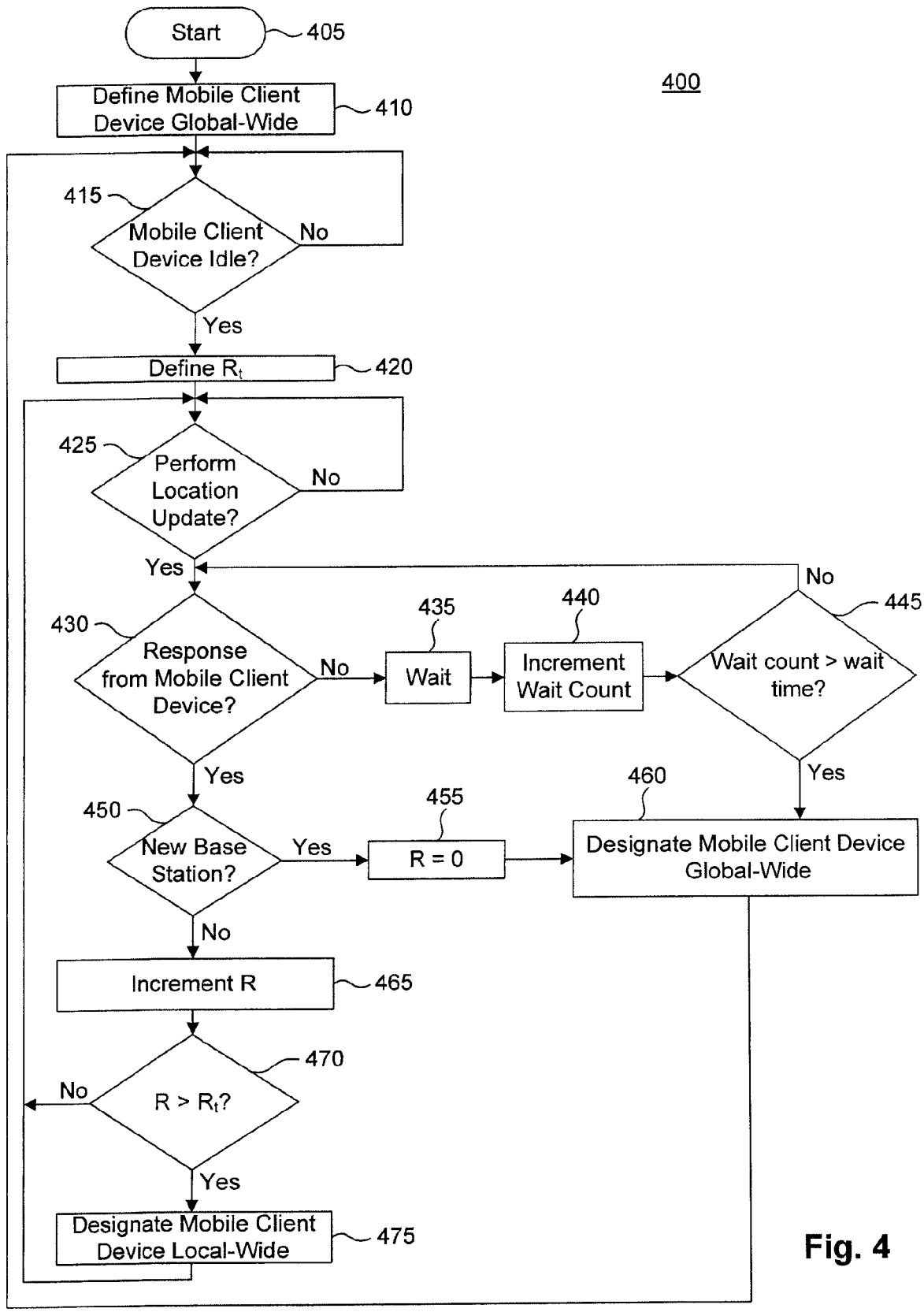
FIG. 4 is a flow chart of an exemplary method for executing a paging update, in accordance with another exemplary embodiment of the invention.

Referring now to FIG. 4, method of location based paging 400 is shown. Method 400, at step 405, initializes communication system 300 shown in FIG. 3. At the outset, control circuitry, such as processor 224 and memory device 226 shown in FIG. 2, for example, define each of the mobile client devices, for example mobile client devices 320, 325, and 330 shown in FIG. 3, as default global-wide devices in step 410. At step 410, the devices may be in an active or idle state. This state is determined at step 415 based on whether or not the base station has established an active communication link with the mobile client device in question. If a communication link with the mobile client device is active (415-No), the control circuitry in the base station continues checking whether or not the communication link has been deactivated and whether or not the mobile client device has become idle.

Once the mobile client device has become idle (415-Yes), a number $R_t$ is defined at step 420. The number $R_t$ is the number of consecutive location updates received by a single base station from a given mobile client device that are required for the mobile client device to be designated as a local-wide device in a given service area. The number $R_t$ may be set to be any number of location updates and may be modified depending on the conditions in the communication system. For example, if $R_t$ is set to be twenty, the base station must receive twenty consecutive location updates from the same mobile client device. That is to say, if even one of the location updates is received by a second base station, the global-wide designation may not be changed until $R_t$ is satisfied or re-defined due to network conditions.

After $R_t$ is defined in step 420, the mobile client device begins performing location updates in step 425. Under the 802.16e standard, there are four conditions that may cause a location update to take place. The conditions are a paging change update, a timer update, a power down update, and a MAC hash skip threshold update. When one or more of these conditions are satisfied (425-Yes) under the 802.16e standard, a location update will take place. When these conditions are not satisfied (425-No), the mobile client device will continue checking whether or not a condition is satisfied in order to perform a location update. The mobile client device will continue checking the conditions until at least one of the conditions is satisfied.

After the location update is supposed to be performed by the mobile client device in step 425, the base station determines whether or not a response has been received from the mobile client device during location update step 430. In the case that a location update response was not received from the mobile client device (430-No), the control circuitry in the base stations executes step 435 to wait for a response. A response wait time is typically designated as an instruction to processor 224 in base station 202 shown in FIG. 2, for example. The number of wait steps is typically accumulated by incrementing a wait count in step 440. In step 445, the wait count is compared to the pre-programmed wait time to determine whether the amount of time that a device has not responded is sufficient to designate the mobile client device as a global-wide device in step 460. The wait time is typically short since the device can be considered as missing from the network.

If it is determined that the amount of time the control circuitry in the base station has waited has not exceeded the pre-programmed wait time (445-No), the control circuitry restarts the wait cycle by returning to step 430 and checking for a response from the mobile client device. If it is determined that the amount of time the control circuitry in the base station has waited exceeds the pre-programmed wait time, (445-Yes), the paging controller will re-designate the mobile client device as a global-wide device. The mobile client device is re-designated because the paging controller has effectively lost the mobile client device. In such a circumstance, re-designating the mobile client device's paging group status to global-wide is an effort by each base station to re-acquire the device everywhere in the communications system since the device is not likely to have left the paging group or the system completely, but only to have left the base station service area to which the device previously sent location updates.

At step 460, the mobile client device will be re-acquired. The mobile client device will begin sending location updates to the base station and return to step 415 and continue as described below.

If the response from the mobile client device is received (430-Yes), the paging controller determines whether the mobile client device is still within the service area provided by the previous base station. If the mobile client device is not still within the service area provided by the previous base station and has in fact moved into the service area of another base station (450-Yes), variable R is reset to zero in step 455. Since R is the number of consecutive location updates received by a single base station from a given mobile client device, and the mobile client device is determined to be in a new area as a result of step 450, R is reset because the mobile client device's location updates are not consecutively sent from within the base station service area. The paging controller designates the mobile client device that has moved into the new service area to the global-wide group in step 460. The new base station then begins receiving location updates from the mobile client device and begins method 400 in that base station for the mobile client device at step 415.

If the result of step 450 is that the base station that has been providing service to the mobile client device will continue providing service to the mobile client device as a result of the location update performed in step 425 (450-No), variable R is incremented in step 465. Increment step 465 is executed to count the number of consecutive location updates that have been returned from a given mobile client device inside the base station service area. Incremented variable R is compared to the number $R_t$ to determine whether or not the number of consecutive location updates in the base station's service area for the mobile client device has met the minimum number of required consecutive updates to designate the device as a local-wide device defined as $R_t$ in step 420 as described above. If variable R is not greater than $R_t$ (470-No), the method returns to step 425 to check whether or not another location update has been performed. If variable R is greater than the number $R_t$, the mobile client device is re-designated as a local-wide device in step 475. Once the mobile client device is designated as a local-wide, the mobile client device will continue to perform location updates in step 425. Method 400 continues in this manner until the mobile client device is turned off or is no longer idle.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of uniquely identifying a mobile client device in a wireless communication network comprising:
    negotiating between a paging controller and at least one mobile client device to determine a current paging cycle configuration and a paging offset;
    providing a list of partial paging identification numbers based on the paging cycle configuration and the paging offset;
    assigning a partial paging identification number on the list to the at least one mobile client device;
    removing the assigned partial paging identification number from the list;
    combining the mobile client device paging cycle information with the partial paging identification number to create a unique final paging identification number; and
    assigning the unique final paging identification number to the mobile client device.

2. A method for a paging controller to identify a mobile client device within a paging group in a wireless communication network, comprising:
    determining a paging cycle configuration and a paging offset configuration for the mobile client device; and
    assigning to the mobile client device a partial paging identification number using the paging cycle configuration and the paging offset configuration,
    wherein the paging cycle configuration, the paging offset configuration, and the partial paging identification number are used together to uniquely identify the mobile client device.

3. The method of claim 2, further comprising:
    combining the paging cycle configuration with the partial paging identification number as a paging ID (PID) to identify the mobile client device.

4. The method of claim 3, further comprising:
    assisting a base station to configure a paging message, the paging message including the PID and a paging request.

5. The method of claim 2, wherein using the paging cycle configuration, the paging offset configuration, and the partial paging identification number together to uniquely identify the mobile client device further comprises uniquely identifying the mobile client device with the partial paging identification number provided by the paging cycle configuration and the paging offset configuration.

6. A method for a paging controller to identify a mobile client device within a paging group in a wireless communication network, comprising:
    determining a paging cycle configuration, a paging offset configuration, and a partial paging identification number for the mobile client device, wherein the partial paging identification number is determined by using the paging cycle configuration and the paging offset configuration; and
    combining the paging cycle configuration with the partial paging identification number to identify the mobile client device.

7. A paging controller to identify a mobile client device within a paging group in a wireless communication network, comprising:
    a processor, the processor being configured to
    determine a paging cycle configuration and a paging offset configuration for the mobile client device; and
    assign to the mobile client device a partial paging identification number using the paging cycle configuration and the paging offset configuration,
    wherein the paging cycle configuration, the paging offset configuration, and the partial paging identification number are used together to uniquely identify the mobile client device.

8. The paging controller of claim 7, wherein the processor is further configured to:
    combine the paging cycle configuration with the partial paging identification number as a paging ID (PID) to identify the mobile client device.

9. The paging controller of claim 8, wherein the processor is further configured to:

assist a base station to configure a paging message, the paging message including the PID and a paging request.

10. The method of claim 7, wherein using the paging cycle configuration, the paging offset configuration, and the partial paging identification number together to uniquely identify the mobile client device further comprises uniquely identifying the mobile client device with the partial paging identification number provided by the paging cycle configuration and the paging offset configuration.

11. A paging controller to identify a mobile client device within a paging group in a wireless communication network, comprising:
   a processor, the processor being configured to
   determine a paging cycle configuration, a paging offset configuration, and a partial paging identification number for the mobile client device, wherein the partial paging identification number is determined using the paging cycle configuration and the paging offset configuration; and
   combine the paging cycle configuration with the partial paging identification number to identify the mobile client device.

12. The paging controller of claim 11, wherein the paging cycle configuration and the partial paging identification number are combined as a paging ID (PID), the processor being further configured to:
   assist a base station to configure a paging message, the paging message including the PID and a paging request.

* * * * *